May 18, 1965 M. H. PETERSON 3,183,859
DIE CELL CONSTRUCTION FOR HAY WAFERING APPARATUS
Filed April 24, 1963 2 Sheets-Sheet 1

INVENTOR.
Merle H. Peterson
BY
Barnard, McGlynn & Leising
ATTORNEYS

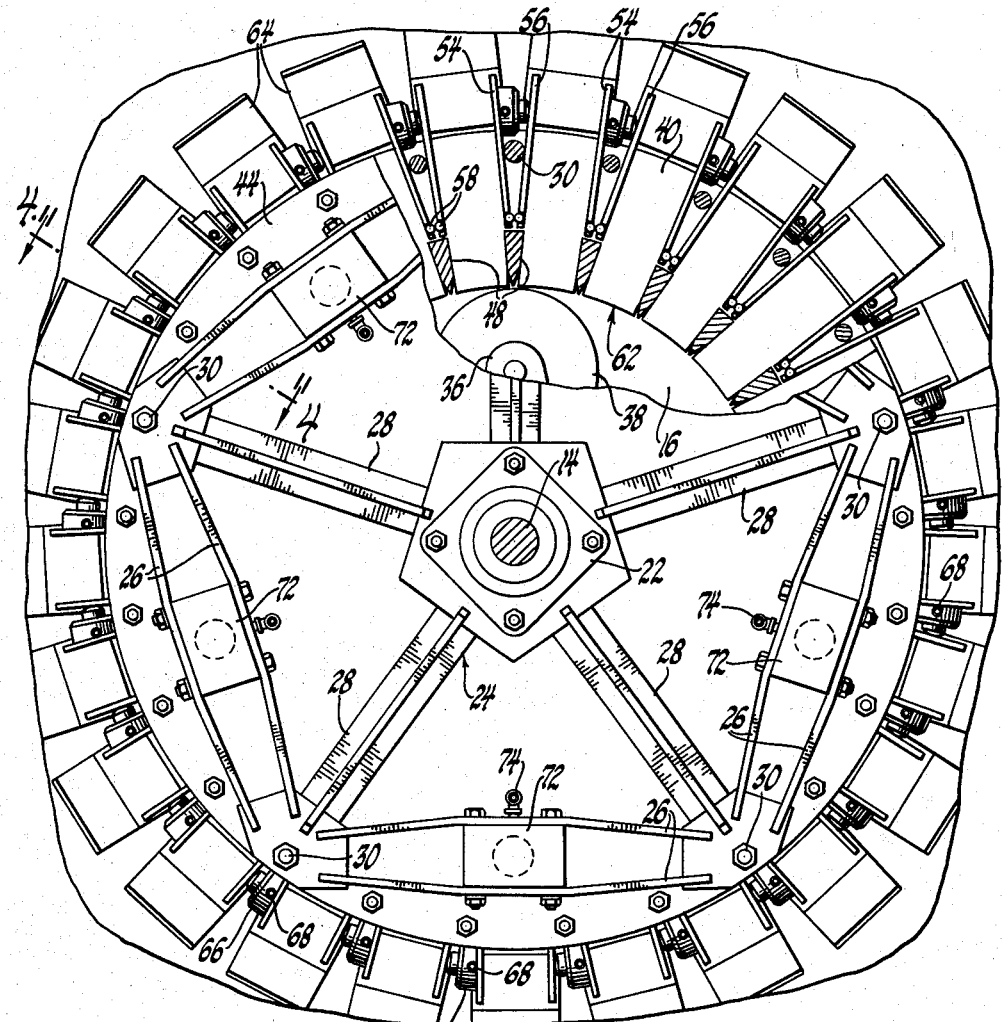

3,183,859
DIE CELL CONSTRUCTION FOR HAY
WAFERING APPARATUS
Merle H. Peterson, Livonia, Mich., assignor to Massey-Ferguson Inc., Detroit, Mich., a corporation of Maryland
Filed Apr. 24, 1963, Ser. No. 275,318
14 Claims. (Cl. 107—14)

This invention relates to an apparatus for producing compressed hay wafers and, in particular, to an improved die cell construction for an apparatus for field wafering forage crops into hay wafers which is particularly characterized by means for removing residual hay retained in the die cells following a prior wafering operation upon initiating a subsequent wafering operation, thereby preventing a clogging or choking condition from occurring within the respective die cells which otherwise would provide a non-uniform rate of flow of compressed hay therethrough and other deleterious consequences.

In recent times, apparatus have been devised for field wafering forage crops into hay wafers comprising means for supplying hay, preferably preconditioned or processed, finely chopped, mixed and blended hay from a windrow within a field, to a hopper communicating with a wafering chamber at one end thereof which, in turn, communicates with the entrance ends of an annular series of axially open die cells, each of which includes opposed movable wall members which may be adjusted to vary the convergent cross sectional areas of the respective die cells from their entrance ends to their exit ends to a substantially uniform extent. Hydraulically operated motor assemblies have been associated with the aforementioned movable wall members of each of the die cells to achieve the aforementioned adjustment and, hence, adjustment of the resistance to an extrusion of hay being compressed through the respective die cells. Rotary hay compaction or compression means has also been provided for compacting or compressing hay received within the wafering chamber into and through the die cells. As a result, as the apparatus moves through a field of mown hay, a continuous extrusion of compressed or compacted hay emerges from the exit ends of the respective die cells, and each extrusion is adapted to be engaged with an ejection means adjacent the exit end of each die cell to break the respective extrusions of hay into wafers which then preferably fall upon conveyor means for removal from the apparatus.

Upon discontinuing wafering operations for a particular period of time as, for example, shutting down the wafering apparatus at the end of a work day, it has been common practice to relieve the fluid pressure supplied to and, hence, adjust the aforementioned motor assemblies to open the cross sectional areas of the respectvie die cells to the maximum extent possible during the terminal portion of the wafering operation being concluded in an effort to flush all residual hay from the respective die cells. However, notwithstanding such a flushing operation, a considerable amount of residual hay very often if not always is still retained within the die cells. Apparently the heat generated within the die cells during the wafering operation being concluded dries and may be said to actually bake the residual hay onto the contiguous die wall members defining the respective die cells. Consequently, upon resumption of the wafering operation, such residual hay tends to adhere to the wall members of the die cells and present a clogging or choking condition within the respective die cells impeding the flow of fresh hay being compressed therethrough as the rotary hay compression means aforementioned successively attempts to compress more and more fresh hay into and through the die cells.

Consequently, a non-uniform rate of flow of compressed extrusions of hay through the respective die cells results, and the choking or clogging action of the baked residual hay can reach such proportions as to impose a sufficiently high load on the engine driving the rotary hay compression means to cause the engine to stall, all of which is highly undesirable. As a practical matter, when such a situation is presented, it is not al all uncommon for the operator of the apparatus being required to manually chip, break and otherwise dislodge the baked residual hay from the die cells to such an extent as to permit the fresh charges of hay being compressed therethrough to flush the baked hay out of the respective die cells which, in and of itself, is highly undesirable.

In view of the foregoing considerations, the present invention contemplates an improved wafering apparatus of the general type aforementioned particularly characterized by two distinct pairs of opposed die wall members defining a die cell having an entrance end communicating with a hay compression means for compressing hay into and through the die cell to form wafers, and means operable to adjustably support and position each die wall member of each pair thereof relative to each other and the die wall members of the other pair thereof to selectively increase and decrease the convergent cross sectional area of the die cell during normal wafering operations, while being operable to selectively open the area of the die cell in a manner to crack or break residual baked hay therefrom which then may be substantially entirely flushed from the die cell upon initiating a subsequent wafering operation during which fresh hay is compressed therethrough, thereby avoiding the clogging or choking conditions aforemenitoned and the undesirable consequences thereof.

More specifically, the present invention contemplates an apparatus for making compressed hay wafers of the type including an annular series of spaced pairs of opposed side die wall members mounted between a pair of spaced opposed annular substantially continuous end die wall members and defining therewtih an annular series of die cells each having an entrance end communicating with hay compression means to compress hay into and through the die cells to form wafers, and is particularly characterized by mounting means mounting the end die wall members for relative movement toward and away from each other and the side die wall members to respectively decrease and increase the cross sectional areas of the die cells, and control means selectively controlling such movement of the end die wall members to break or scale baked residual hay from the respective die cells for subsequent flushing therefrom by fresh hay being compressed therethrough upon beginning a subsequent wafering operation.

More specifically in this regard, the invention is particularly characterized by the fact that the aforementioned annular series of spaced pairs of side die wall members are pivotally mounted between the aforementioned end die wall members in such a manner as to be adjustably convergent relative thereto between the entrance and exit ends of the respective die cells to provide optimum wafering conditions during a given wafering operation and to permit the respective end die wall memebrs to move relatively toward and away from each other at selected times to flush baked residual hay from the respective die wall members.

In addition, in this regard, the apparatus is further characterized by an annular series of spaced knife edges respectively mounted between the end die wall members at the entrance ends of the respective die cells in a manner also permitting the end die wall members to move relative to each other as aforementioned, and permitting such knife edges to vibrate as the end die wall members move apart to facilitate breaking of the baked residual hay from the die wall members of the die cells for the purposes aforementioned.

In its more specific aspects, the invention is particularly characterized by the fact that relative movement of the opposed side die wall members to vary the convergent cross sectional areas of the respective die cells and relative movement of the end die wall members are respectively controlled by control means which are independently operable whereby, upon discontinuing a wafering operation, the side die wall members may be opened to a maximum extent to flush as much residual hay as possible from the die cells and, upon initiating a subsequent wafering operation, the end die wall members may be permitted to move relatively apart under the influence of fresh hay being compacted therethrough to break or scale residual baked hay from the die wall members of the die cells and flush such hay therefrom as the new fresh hay is compressed therethrough. In this regard, the control means for the end die wall members of the respective die cells is preferably selectively operable to alternately move the latter positively relatively toward each other to a normal wafering position followed by subsequent release thereof for movement away from each other under the influence of fresh hay being compressed therethrough to chip or break the baked hay from the die wall members, such alternate movement of the end die wall members being repeated as many times as required to eliminate the baked residual hay from the die cells thereby resulting in a substantially complete flushing of the respective die cells upon initiating a wafering operation.

In order to facilitate an understanding of the invention, a preferred embodiment thereof will now be described with reference to the accompanying drawings in which:

FIGURE 2 is a fragmentary view taken on line 2—2 of FIGURE 1;

FIGURE 4 is a fragmentary sectional view taken on line 4—4 of FIGURE 2.

Figures 1, 3:
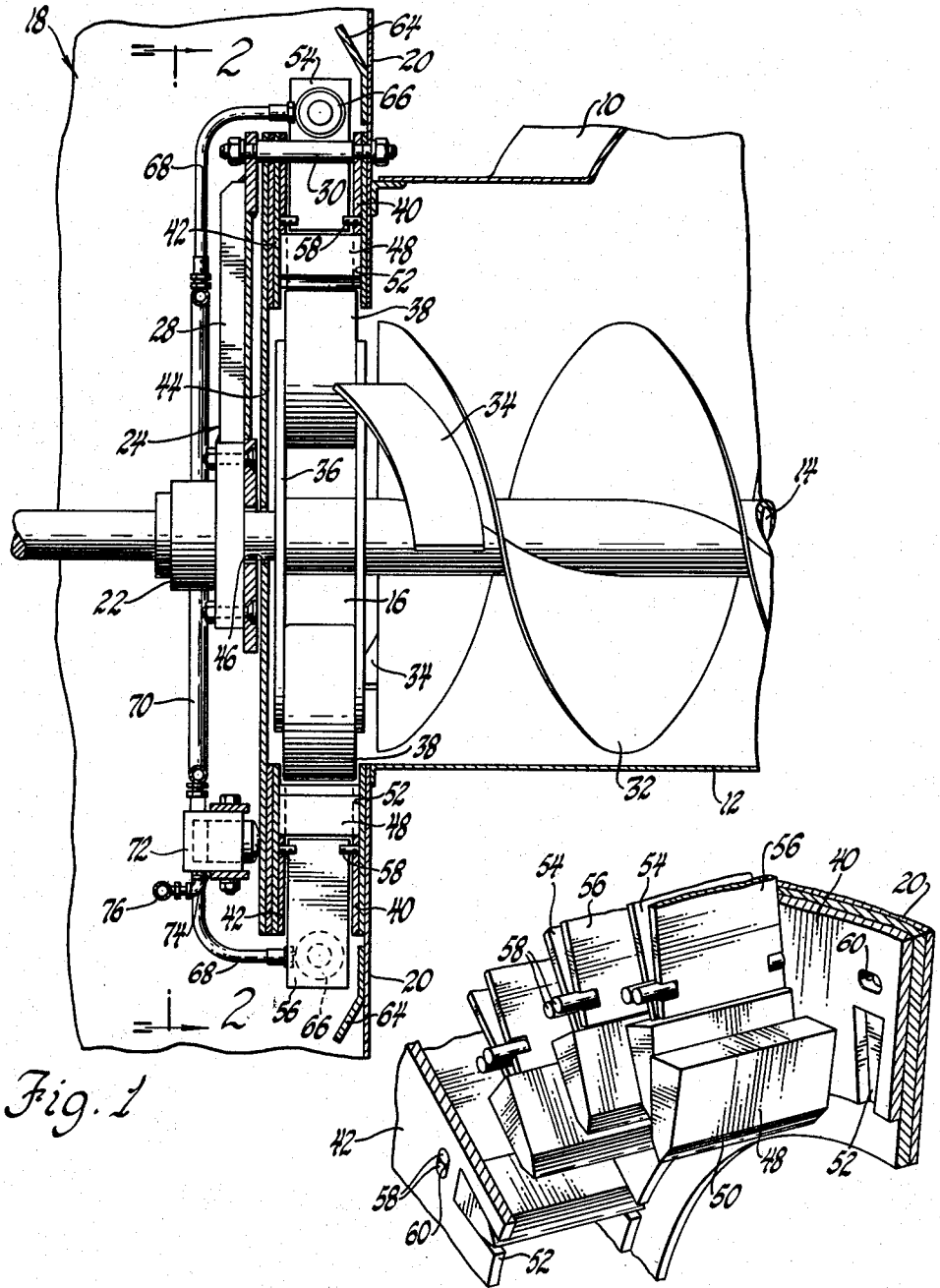
FIGURE 1 is an enlarged fragmentary longitudinal sectional view of a hay wafering apparatus illustrating a preferred embodiment of the invention.
FIGURE 3 is an enlarged fragmentary partially exploded perspective view of a portion of the die cell construction of the apparatus.

At this juncture, it should be noted that the apparatus illustrated in the various figures of the drawings aforementioned and to be described below may form a part of an otherwise conventional mobile hay wafering apparatus including further components thereof which, in and of themselves, form no part of the present invention and may take several forms which are known and commercially available in the art. Therefore, in order not to obscure the invention, the usual pick-up mechanism for picking up and delivering hay to be wafered to the structure shown in the drawings as well as further components such as conveyor means for discharging completed wafers from the apparatus have not been shown in the drawing. In this regard, reference may be made to the copending United States patent application, Serial No. 235,471, entitled "Hay Wafering Method and Apparatus," filed November 5, 1962 in the name of Stanley L. Lawrence and assigned to the assignee of the present invention for a more detailed description of one type of mobile wafering apparatus with which the present invention may be utilized.

Thus, it will be understood that the apparatus of this invention is adapted to be towed along a field of mown or cut hay, preferably with the hay arranged in windrows and having been pre-conditioned or processed in a known manner so as to consist of finely chopped, mixed and blended stem and leaf components forming a substantially homogenous mass. As the apparatus is towed along the field, the hay mixture in a given windrow is adapted to be picked up in a conventional pick-up mechanism as aforementioned, which may be of the known type including a rotary flail device, and to be delivered through a suitable delivery chute to a hopper suitably mounted on the mobile unit aforementioned and operatively associated with a wafering chamber and die cell construction now to be described in specific detail.

Thus, and referring now to the drawings, a delivery chute 10 of the type aforementioned is illustrated as communicating with a suitable opening in the side wall of a horizontally disposed generally cylindrical hopper 12 having an open end, at the leftward end thereof as illustrated in FIGURE 1, communicating with a wafering chamber to be described, whereby a stream of homogenized hay is picked up by the aforementioned pick-up mechanism and delivered to the hopper 12 for feed therefrom to the wafering chamber in a manner to be described.

A horizontally disposed rotatable drive shaft 14 has one end thereof suitably drivingly coupled to the usual engine of the apparatus in a manner well known in the art, extends horizontally through the hopper 12 and through an annular vertically disposed wafering chamber 16 located just axially beyond and communicating with the aforementioned open end of the hopper, and therebeyond through an enlarged fixed housing member indicated generally at 18 as surrounding the wafering chamber 16 and the die cell construction associated therewith and including the annular fixed wall member 20 associated with the open end of the hopper. The other end of the drive shaft may be coupled as required or desired to other instrumentalities of the apparatus such as, for example, the aforementioned pick-up mechanism or the conveyor mechanism for discharge of completely formed wafers as will be readily apparent to those acquainted with this art. The drive shaft 14 is suitably rotatably mounted within the hopper by bearing means including the bearing means 22 mounted on a support or frame means indicated generally at 24 located axially beyond the wafering chamber 16. The support or frame means 24 comprises a plurality of angularly related arm members 26 rigidly connected together in end-to-end relation, and the spoke members 28 projecting radially inwardly from the respective connections of such arm members and connected to the bearing means 22 to support the latter and the shaft 14. The support or frame means 24 is fixedly mounted on the apparatus by means including a plurality of circumferentially spaced bolts 30 or the like extending between and suitably secured to spaced portions of the wall member 20 of the housing member 18 and correspondingly spaced portions of the support or frame means associated with the respective connections of the arm members 26.

A multiple flight feed auger 32, herein shown to consist of two flights, is secured on the drive shaft 14 within the hopper 12 so as to be radially inwardly spaced from the cylindrical side wall of the latter, while a pair of arcuate deflector vanes 34 project from one end of each auger flight into the wafering chamber 16. A pair of axially spaced radially extending arms 36 have their central portions suitably rigidly secured to the drive shaft for rotation therewith within the wafering chamber, and have journaled at the opposite ends thereof a pair of compaction or compression rollers 38. The deflector vanes 34 are disposed in advance of the path of rotation of the arms 36 and the respective rollers 38 within the wafering chamber for a purpose to appear hereinafter.

The wafering chamber 16 includes a pair of oppositely spaced annular continuous substantially parallel end die wall members 40 and 42, respectively, the end die wall member 40 being suitably fixedly mounted about the respective bolts 30 and against the wall 20 of the housing member 18 adjacent the open end of the hopper 12, while end die wall member 42 is suitably secured generally about the periphery of a circular plate 44 having a central opening 46 permitting passage therethrough of shaft 14. Spaced portions of the end die wall member 42 and plate 44 are received upon the bolts 30 for slidable movement thereon within a predetermined limited extent toward and away from the end die wall member 40 between the latter and support or frame means 24 in a manner to be described hereinafter.

An annular or circumferentially spaced series of substantially identical knife members 48 extend between and have their opposite ends respectively mounted on the end die wall members 40 and 42 in a manner to permit relative movement between the latter as aforedescribed, while at all times being maintained in an operative relationship thereto. Thus, and as illustrated particularly in FIGURE 3, the respective knife members 48 taper inwardly toward their cutting edge surface 50 so as to have cross sectional configurations similar to the configurations of opposed mounting pockets 52 respectively formed in the end die wall members 40 and 42 and axially slidably receiving opposite ends of the respective knife members. Thus, the limited extent of permitted movement of the end die wall member 42 away from the end die wall member 40 is such to insure that the ends of the respective knife members are at all times retained within the respective mounting pockets 52, while permitting relative movement of the end die wall members as aforedescribed.

An annular or circumferentially spaced series of pairs of side die wall members 54 and 56 are pivotally mounted between the end die wall members by means of pivot pins 58 having the opposite ends thereof pivotally and axially slidably disposed in opposed mounting pockets 60 respectively carried by the end die wall members 40 and 42. Thus, such mountings of the pivot pins 58 permit relative pivotal movement of the side die wall members of each pair thereof while permitting movement of the end die wall member 42 relative to the end die wall member 40 without any danger of the side die wall members dropping from between the end die wall members. The side die wall members 54 and 56 diverge radially outwardly from the pivot pins 58 to form an annular or circumferentially spaced series of axially open die cells, indicated generally at 62 in FIGURE 2, between the end die wall members 40 and 42 and respective oppositely spaced side die wall members 54 and 56 of an adjacent pair thereof.

As will be apparent, in the embodiment shown, the axes of the respective die cells 62 are contained in a common plane perpendicular to the axis of rotation of the drive shaft 14 and, with the apparatus carried by a mobile unit as aforedescribed traversing a horizontal ground surface, in a vertical plane relative to the ground. A plurality of ejection plates 64 are suitably rigidly secured to the wall 20 of the housing member 18 in association with each of the respective die cells 62 and extend obliquely to the axes thereof as indicated particularly in FIGURES 1 and 4, whereby extrusions of hay compressed through the die cells will strike the ejection plates, be bent laterally of the axes of the die cells or to the left in FIGURE 1 to break the extrusions substantially at the exit ends of the die cells to form wafers. Such formed wafers then fall by gravity within the housing member 18 and preferably upon one end of a suitable elevator type conveyor disposed beneath the bottom of the housing member to convey the wafers from the apparatus preferably into a trailing conveyance.

During normal wafering operations, the cross sectional areas of the respective die cells 62 preferably converge radially outwardly from the entrance ends toward the exit ends thereof due to the fact that the respective oppositely disposed side die wall members 54 and 56 forming a part of each die cell converge in this manner. In order to adjust the degree of convergence of the cross sectional areas of each of the die cells to a substantially uniform extent, an hydraulically operated motor assembly 66 of the type comprising relatively reciprocable piston and cylinder elements is interposed between each pivotal pair of side die wall members 54 and 56 to control their angular relationship about their pivot pins 58. Each of the motor assemblies 66 is individually connected by a conduit 68 to a common fluid manifold 70 adapted to be supplied with fluid under a preselected variable pressure from a suitable source to control the convergent cross sectional areas of the respective die cells during the wafering operation and as hay is being compressed therethrough.

In order to selectively control relative axial movement of the one end die wall member 42 toward and away from the other end die wall member 40, a second set of hydraulically operated motor assemblies 72 of the same general type as those previously described have their cylinder elements suitably mounted in equidistantly spaced fixed positions on the respective arm members 26 of the support or frame means 24 with their piston elements projecting therefrom and being engageable with similarly spaced portions of the plate 44. Each of the motor assemblies is individually connected by a conduit 74 to a common fluid manifold 76 adapted to have fluid under a preselected pressure alternately selectively supplied thereto and exhausted therefrom.

At this juncture, it may be noted that the rollers 38 are positioned so as to be closely spaced to but not engage the knife members 48 and the entrance ends to the respective die cells 62 disposed opposite the rotary path of travel of the rollers. Thus, hay may be picked up in the continuous fashion from a windrow in a field and delivered into the hopper 12 from which it is fed by the multiple flight feed auger 32 continuously in the wafering chamber 16 where it is laid across the knife members 48 and the entrance ends of the respective die cells in advance of the rotative path of travel of the rollers 38. The rollers, upon successive rotative passes thereof, act to force the hay past the knife members and compact and compress it into and through the respective die cells to result in extrusions of hay emerging from the exit ends of each of the die cells. As aforementioned, such extrusions of hay may engage the ejection plates 64 at the exit ends of the respective die cells so as to break the respective extrusions to form wafers which then fall from the wafering apparatus preferably onto a conveyor mechanism as aforementioned for removal from the apparatus.

In operation, and during a particular wafering operation, fluid under a preselected variable pressure will be supplied to the manifold 70 and, hence, to the respective motor assemblies 66 to adjust the degree of convergence of the cross sectional areas of the respective die cells 62 to a substantially uniform extent in accordance with the wafering conditions encountered at that time. Furthermore, fluid under pressure will be supplied to the manifold 76 and, hence, to the motor assemblies 72 to move the plate 44 and end die wall member 42 to the right in FIGURE 1 to the closest position it can assume with respect to the other end die wall member and the side die wall members 54 and 56. During normal wafering operations, pressure is held in the manifold 76 to hold the end die wall members in the close relationship aforementioned, while fluid pressure in the manifold 70 may be adjusted to adjust the degree of convergence of the die cells in accordance with variations in wafering conditions.

Upon terminating wafering operations for a predetermined period of time, pressure is bled from the manifold 70 and, hence, from the motor assemblies 66 to permit terminal charges of hay being compressed between the side die wall members 54 and 56 to pivot the latter away from each other into substantial parallelism to open the die cell areas to a maximum extent permitted by the side die wall members, thereby providing an initial flushing action of residual hay within the respective die cells. As mentioned previously, however, as a practical matter a substantial portion of residual hay is more often than not retained within the respective die cells and is dried or baked onto the side die wall members 54 and 56 and the end die wall members 40 and 42 and parts associated therewith which have a tendency to cause a choking or clogging action when initially starting a fresh wafering operation.

Thus, as a subsequent wafering operation is initiated, pressure is bled from the manifold 76 and the motor assemblies 72 whereby the fresh charges of hay being fed to the wafering chamber and compressed into the respective die cells upon successive rotative passes of the compression or compaction rollers 38 and vibration in the apparatus force the end die wall member 42 axially away from the end die wall member 40, thereby causing the baked residual hay disposed or confined within the die cells to break or flake from the interior wall members thereof and to be flushed therefrom by the fresh charge of hay being compressed therethrough. If the baked residual hay is thereby removed from the die cells upon one cycle of releasing the pressure from the manifold 76, pressure is reapplied to the latter to redispose the end die wall member 42 in its closest position with respect to the die wall member 40 which is the normal wafering position in which it is retained throughout the entire subsequent wafering operation. On the other hand, in the event that the residual hay is not effectively removed by one cycle of releasing the pressure from the manifold 76, such cycle may be repeated a number of times whereby the end die wall member 42 is alternately permitted to move away from the end die wall member 40 and then is returned to its normal wafering position a sufficient number of times so as to result in substantial removal of all of the baked residual hay within the die cells and avoidance of the clogging or choking condition which otherwise might occur within the die cells.

In this regard, with the end die wall member 42 moved away from the die wall member 40 for the purposes aforementioned, the knife members 48 are relatively loosely confined within their respective mounting pockets 52 and are capable of and do vibrate under the influence of the natural vibration of the apparatus as it is being towed along the relatively rough terrain of the field in which the wafering apparatus is being towed. Thus, such vibration supplements the relative movement between the end die wall members to contribute to breaking or flaking residual baked hay from the surfaces of the die cells for the purposes aforementioned.

The embodiments of the invention in which an exclusive property or privilege is claimed are defined as follows:

1. In an apparatus for making compressed hay wafers, and of the type including two pairs of opposed die wall members defining a die cell having an entrance end communicating with hay compression means to compress hay into and therethrough to form wafers; the improvement comprising means respectively mounting said pairs of die wall members for movement relative to each other, and control means controlling relative movement of said respective pairs of die wall members and being alternatively selectively operable to bias the latter relatively toward each other and to completely release said respective pairs of die wall members for free relative movement away from each other as hay is compressed into said die cells.

2. In an apparatus for making compressed hay wafers, and of the type including two pairs of opposed die wall members defining a die cell having an entrance end communicating with hay compression means to compress hay into and therethrough to form wafers; the improvement comprising mounting means respectively mounting said pairs of die wall members for independent movement relative to each other, and control means selectively controlling relative movement of said respective pairs of die wall members independently of each other and being alternately selectively operable to bias the latter relatively toward each other and to completely release said respective pairs of die wall members for free relative movement away from each other as hay is compressed into said die cells.

3. In an apparatus for making compressed hay wafers, and of the type comprising means including a pair of spaced opposed annular continuous die wall members defining an annular series of die cells each having an entrance end communicating with hay compression means to compress hay into and therethrough to form wafers; the improvement comprising mounting means mounting said die wall members for relative movement toward and away from each other to respectively decrease and increase the cross sectional areas of said die cells, and control means selectively controlling relative movement of said die wall members and being alternately selectively operable to bias the latter relatively toward each other and to completely release said die wall members for free relative movement away from each other as hay is compressed into said die cells.

4. The apparatus according to claim 3 further comprising support means spaced from and fixed relative to one of said die wall members, said mounting means mounting the other of said die wall members between said support means and said one of said die wall members for movement toward and away from the latter.

5. The apparatus according to claim 3 further comprising support means spaced from and fixed relative to one of said die wall members, said mounting means mounting the other of said die wall members between said support means and said one of said die wall members for movement toward and away from the latter, and wherein said control means comprises selectively operable motor means mounted on said support means and operatively connected to said other of said die wall members to control movement thereof.

6. The apparatus according to claim 3 further comprising support means spaced from and fixed relative to one of said die wall members, said mounting means mounting the other of said die wall members between said support means and said one of said die wall members for movement toward and away from the latter, and wherein said control means comprises a plurality of fluid pressure operated motor assemblies mounted in spaced relationship on said support means and operatively connected to said other of said die wall members to control movement thereof, a source of selectively adjustable fluid pressure including a manifold, and individual conduit means connecting said manifold to each of said motor assemblies.

7. The apparatus according to claim 3 further comprising an annular series of spaced knife edges disposed between said die wall members at the entrance ends of said die cells, and mounting means mounting said knife edges on said respective die wall members to permit relative movement thereof and vibration of said knife edges upon movement of said die wall members relatively away from each other.

8. The appparatus according to claim 7 wherein said mounting means mounting said knife edges on said respective die wall members comprises mounting pockets on said respective die wall members loosely confining opposite ends of said knife edges at least upon movement of said die wall members relatively away from each other.

9. The apparatus according to claim 3 wherein said means defining said annular series of die cells further comprises an annular series of pairs of opposed die wall members disposed between said first-named die wall members, and pivot means pivotally mounting said series of pairs of die walls members between said first-named die wall members to adjustably vary the convergent cross sectional areas of said die cells independently of relative movement of said first-named die wall members.

10. The apparatus according to claim 3 wherein said means defining said annular series of die cells further comprises an annular series of pairs of opposed die wall members disposed between said first-named die wall members, and pivot means pivotally mounting said series of pairs of die wall members between said first-named die wall members to adjustably vary the convergent cross sectional areas of said die cells independent of relative movement of said first-named die wall members, said pivot means permitting relative movement of said first-named die wall members, and control means selectively controlling pivotal movement of said series of pairs of die wall members independently of said control means controlling relative movement of said first-named die wall members.

11. In an apparatus for making compressed hay wafers, and of the type including an annular series of spaced pairs of opposed side die wall members mounted between a pair of spaced opposed annular end die wall members and defining therewith an annular series of die cells each having an entrance end communicating with hay compression means to compress hay into and therethrough to form wafers; the improvement comprising mounting means mounting said end die wall members for relative movement toward and away from each other to respectively decrease and increase the cross sectional areas of said die cells, and control means selectively controlling relative movement of said end die wall members and being alternately selectively operable to bias the latter relatively toward each other and to completely release said end die wall members for free relative movement away from each other as hay is compressed into said die cells.

12. The apparatus according to claim 11 further comprising support means spaced from and fixed relative to one of said end die wall members, said mounting means mounting the other of said end die wall members between said support means and said one of said end die wall members for movement toward and away from the latter, and wherein said control means comprises a plurality of fluid pressure operated motor assemblies mounted in spaced relationship on said support means and operatively connected to said other of said end die wall members to control movement thereof, a source of selectively adjustable fluid pressure including a manifold, and individual conduit means connecting said manifold to each of said motor assemblies.

13. The apparatus according to claim 12 further comprising an annular series of spaced knife edges respectively disposed between said end die wall members at the entrance ends of said die cells, and mounting means mounting said knife edges on said respective end die wall members to permit relative movement thereof and vibration of said knife edges upon movement of said end die wall members relatively away from each other.

14. The apparatus according to claim 12 further comprising pivot means pivotally mounting said series of pairs of side die wall members between said end die wall members to adjustably vary the convergent cross sectional areas of said die cells independent of relative movement of said end die wall members, said pivot means permitting relative movement of said end die wall members, and control means selectively controlling pivoted movement of said series of pairs of side die wall members independently of said control means controlling relative movement of said end die wall members.

References Cited by the Examiner
UNITED STATES PATENTS

| | | |
|---|---|---|
| 2,148,003 | 2/39 | Wurtzel. |
| 2,332,170 | 10/43 | Sapp. |
| 2,958,900 | 11/60 | Meakin. |
| 3,134,344 | 5/64 | Lundell _____ 107—14 |

OTHER REFERENCES

"Agricultural Engineering," S.671.A3, August 1961, 56-1 (pages 412–415 and 423). (Copy in Group 410.)

Western Livestock Journal, April 1961, pages 36 and 29. (Copy in Group 470.)

WALTER A. SCHEEL, *Primary Examiner.*